(12) United States Patent
Klausner et al.

(10) Patent No.: US 6,919,000 B2
(45) Date of Patent: Jul. 19, 2005

(54) DIFFUSION DRIVEN DESALINATION APPARATUS AND PROCESS

(75) Inventors: James F. Klausner, Gainesville, FL (US); Renwei Mei, Gainesville, FL (US)

(73) Assignee: University of Florida, Gainesville, FL (US)

( * ) Notice: Subject to any disclaimer, the term of this patent is extended or adjusted under 35 U.S.C. 154(b) by 100 days.

(21) Appl. No.: 10/322,061

(22) Filed: Dec. 17, 2002

(65) Prior Publication Data

US 2004/0113291 A1 Jun. 17, 2004

(51) Int. Cl.$^7$ .............................. B01D 3/28; B01F 3/04
(52) U.S. Cl. ................... 203/10; 96/300; 203/DIG. 17; 210/150; 261/94; 261/112.1; 261/112.2
(58) Field of Search ......................... 261/112.1, 112.2, 261/96–98, 94, DIG. 10, DIG. 32, 21, 22; 96/300, 360; 210/150, 151; 203/10, 11, DIG. 17

(56) References Cited

U.S. PATENT DOCUMENTS

| | | | | |
|---|---|---|---|---|
| 2,485,849 A | * | 10/1949 | Simmons .................. | 261/112.2 |
| 3,016,234 A | * | 1/1962 | Huppmeier .................. | 261/98 |
| 3,214,348 A | * | 10/1965 | Lichtenstein .......... | 261/112.1 X |
| 3,214,349 A | | 10/1965 | Kehoo et al. .................. | 203/11 |
| 3,214,351 A | * | 10/1965 | Lichtenstein et al. . | 261/112.1 X |
| 3,330,741 A | * | 7/1967 | Theilig et al. ............. | 261/94 X |
| 3,345,272 A | | 10/1967 | Collins .......................... | 203/11 |
| 3,518,817 A | * | 7/1970 | Dell'Agnese et al. .......... | 96/360 |
| 3,560,167 A | * | 2/1971 | Bruckner et al. .......... | 261/94 X |
| 3,953,972 A | | 5/1976 | Awerbuch et al. .......... | 60/641.5 |
| 4,299,786 A | * | 11/1981 | Sanderson et al. .... | 261/112.1 X |
| 4,312,646 A | * | 1/1982 | Fattinger et al. .......... | 96/300 X |
| 4,427,605 A | * | 1/1984 | Meier et al. .................. | 261/97 |
| 5,470,441 A | * | 11/1995 | Brown ...................... | 261/96 X |
| 5,558,687 A | * | 9/1996 | Cain .......................... | 261/98 X |
| 5,779,993 A | * | 7/1998 | Gentry ...................... | 261/94 X |
| 5,925,291 A | | 7/1999 | Bharathan et al. .......... | 261/69.1 |

FOREIGN PATENT DOCUMENTS

| | | |
|---|---|---|
| DE | 3222537 | 12/1983 |
| DE | 4341273 | 6/1995 |
| GB | 1248436 | 10/1971 |

OTHER PUBLICATIONS

Al–Hallaj, et al. "Solar desalination with a humidification-dehumidification cycle: performance of the unit," Desalination, 120:273–280, 1998.

Assouad, Y. and Lavan, Z., "Solar Desalination With Latent Heat Recovery," Journal of Solar Energy Engineering, 110: 14–16, 1988.

Bharathan et al., "Direct–Contact Condensers for Open-Cycle OTEC Applications," National Renewable Energy Laboratory SERI/TP–252–3108 for DOE Contract No. DE–AC02–83CH10093, 1986.

(Continued)

Primary Examiner—Richard L. Chiesa
(74) Attorney, Agent, or Firm—Akerman Senterfitt

(57) ABSTRACT

A diffusion driven desalination apparatus and related method includes structure for receiving a heated water stream and creating at least one region having a thin film of water and structure for forcing a low humidity air stream over the thin film of water, wherein water from the thin film of water evaporates and diffuses into the air stream to create a humidified air stream. A diffusion tower including at least one plenum can be used to create and transfer the humidified air stream. At least one condenser, such as a direct contact condenser, condenses the humidified air stream, wherein purified water is produced. Waste heat from a power plant can be used to provide the heated water stream and power plants can use the waste heat generated to inexpensively provide purified water.

36 Claims, 16 Drawing Sheets

OTHER PUBLICATIONS

Bourouni et al., "Water desalination by humidification and dehumidification of air: state of the art," Desalination, 137:167–176, 2001.

Bullard, C. and Klausner, J., "Empirical Analysis of Power Plant Siting," Energy Systems and Policy, 11: 103–120, 1987.

Larson et al., "The Carrier–Gas Process—A New Desalination and Concentration Technology," Desalination, 73:119–137, 1989.

California Coastal Commission, "Seawater Desalination in California," a Report by the California Coastal Commision, 1999.

Nawayseh et al., "Solar desalination based on humidification process–l, Evaluating the heat and mass transfer coefficients," Energy Conversion & Management, 40:1423–1439, 1999.

* cited by examiner

Rate of entropy generation in the diffusion tower for $T_H$=27 °C.

Variation of exit brine temperature with exit air temperature for $T_H=27$ °C.

Fresh water production efficiency for $T_H = 27\ °C$.

Rate of entropy generation in the diffusion tower for $T_H = 60\ °C$.

Rate of entropy generation in the diffusion tower for $T_H = 80\ °C$.

Variation of exit brine temperature with exit air temperature for $T_H = 60\ °C$.

Variation of exit brine temperature with exit air temperature for $T_H = 80\ °C$.

Fresh water production efficiency for $T_H = 60\ °C$.

Fresh water production efficiency for $T_H = 80 \, °C$.

Rate of energy consumption for $T_H = 60\ °C$

Rate of energy consumption for $T_H = 80\ °C$.

Rate of energy consumption on magnified scale for $T_H = 60\ °C$.

Rate of energy consumption on magnified scale for $T_H = 80\ °C$.

DIFFUSION DRIVEN DESALINATION APPARATUS AND PROCESS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to water desalination systems and methods.

BACKGROUND

The continuous rise in the world population and the expansion of industrial facilities around the globe has placed a growing demand on the fresh water supply from natural resources, such as rivers, fresh water lakes, underground aquifers, and brackish wells. These resources have been steadily on the decline since the early 1950's. Therefore, there is clearly a need for new fresh water resources to balance the growing consumption rate.

Since 96% of the earth's surface is covered with saline water, there has been and continues to be strong motivation for developing water desalination technologies. Today there are more than 7,500 desalination plants in operation worldwide, and about two thirds of those are operating in the Middle East. Saudi Arabia operates the largest desalination plant, with a capacity of 128 MGD. The United States accounts for about 12% of the world's desalination capacity.

Desalination involves any process in which dissolved minerals are removed from saline or brackish water. Technologies for desalination include distillation, reverse osmosis, electro-dialysis, and vacuum freezing. Distillation and reverse osmosis are the most common. Distillation technologies include Multiple Effect Distillation (MED) and Multi-Stage Flashing (MSF), both of which operate by evaporating saline water at atmospheric or reduced pressure and condensing the vapor to produce fresh potable water. Reverse Osmosis (RO) operates on a filtering principle. High pressure pumps force saline water through nanofilter membranes allowing fresh water to pass while filtering out the dissolved minerals. Although distillation and reverse osmosis technologies currently provide the most cost effective method for desalination, they are both very energy intensive. Accordingly, whether or not these desalination techniques remain cost effective strongly depends on energy prices.

A desalination technology that has drawn interest over the past two decades is referred to as Humidification Dehumidification (HDH). According to the HDH process, saline water is pumped through a condenser coil, where it picks up heat from condensing water vapor. The saline water is then pumped through a solar collector where it collects more heat. The saline water is then sprayed in a cooling tower, where a portion of it evaporates into the air. The water vapor is then condensed over the condenser coil of a conventional tube condenser. An advantage of this type of technology is that it permits low pressure, low temperature desalination. El-Bourouni et al. (2001), El-Hallaj (1998), and Assouad et al. (1988) respectively reported the operation of HDH units in Tunisia, Jordan, and Egypt, respectively.

Another type of desalination technology that makes use of water evaporating into an air stream is the Carrier-Gas Process (CGP) reported by Larson et al. (1989). A CGP system consists of two chambers separated by a common heat transfer wall. One chamber is used for evaporation and the other for condensation. Ambient air is directed through the evaporation chamber and mixed with high salinity feed water. The air picks up heat from the heat transfer wall and increases in temperature as it moves through the evaporation chamber. Some of the feed water evaporates into the air and the rest is removed as concentrate. The humidified air is heated in a heater and is then sent to a condensation chamber where the water vapor is condensed out. Purified writer is collected in the condensation chamber.

Even though both HDH and CGP may provide some level of improved efficiency compared to more conventional desalination methods, HDH and CGP are both still energy intensive and provide limited water production efficiency (e.g. kilograms of fresh water per kilogram of feed water). Accordingly, even these improved methods still generally have limited application.

SUMMARY OF THE INVENTION

A diffusion driven desalination (DDD) process and apparatus is driven by water vapor saturating low humidity air. Liquid water is then condensed out of the air/vapor mixture in a condenser. The invention is suitable for operation at low temperature and pressure and may be driven by waste heat with low thermodynamic availability. The energy consumption for the DDD process is comparable to that for conventional flash evaporation and reverse osmosis processes.

An apparatus for purifying water includes a structure for receiving a heated water stream and creating at least one region having a thin film of water from the heated water stream. A structure for forcing a low humidity air stream over the thin film of water is also provided which causes water from the thin film of water to evaporate and diffuse into the air stream to create a humidified air stream. As used herein, the phrase "low humidity air stream" refers to an air stream which includes less humidity as compared to the "humidified air stream" formed by evaporation and diffusion of water into the low humidity air stream. At least one condenser is provided for condensing the humidified air stream, wherein purified water is obtained. The process described above performed by the claimed apparatus is referred to herein as a Diffusion Driven Desalination (DDD) process.

The heated water stream can be heated at least in part by at least one heat exchanger. The heated water stream can be supplied by a variety of heat sources, including low pressure condensing steam from a power plant, waste heat from a combustion engine, and geothermal heat. The condenser preferably comprises a direct contact condenser.

The structure for creating regions having thin films of water preferably comprises a diffusion tower. The diffusion tower can include at least one plenum for drawing the humidified air stream out from the diffusion tower so that it can be condensed. The plenum includes at least one inlet, the inlet at least in part facing a top of the diffusion tower. This orientation helps prevent the heated water stream from entering the plenum.

The structure for forcing an air stream over the thin film of water can comprise an air duct positioned near a bottom of the diffusion tower, the air duct including a plurality of holes, the plurality of holes facing a side or a bottom of the diffusion tower, such as transverse to a height of the diffusion tower.

The condenser can provide at least a portion of the low humidity air stream by dehumidifying air using a cooling water stream. Provided sufficient thermal stratification exists, a single body of water can provide both the heated water stream and the cooling water stream by drawing the heated water stream from a surface of the body of water while the cooling water stream is drawn from a depth below the surface. In one embodiment of the invention, the heated water stream can be provided exclusively by a body of water so that no external heat source is required to provide the heated water stream. In another embodiment of the invention, heat to produce the heated water stream is supplied by a solar source.

A power plant including a desalination system includes an apparatus for converting a source of energy into heat and at least a portion of the heat into steam, and structure for converting cool water supplied into a heated water stream using at least a portion of the steam. A structure for creating regions having thin films of water from the heated water stream is provided along with structure for forcing a low humidity air stream over the thin film of water, wherein water from the thin film of water evaporates and diffuses into the low humidity air stream to create a humidified air stream. At least one condenser is provided for condensing the humidified air stream, wherein purified water is produced. The condenser preferably comprises a direct contact condenser.

The source of energy comprises at least one fossil fuel or at least one nuclear fuel. The structure for creating regions having thin films of water preferably comprises a diffusion tower. The diffusion tower can include at least one plenum for drawing the humidified air stream out from the diffusion tower. The structure for forcing an air stream over the thin film of water can comprise an air duct positioned near a bottom of the diffusion tower, wherein the air duct includes a plurality of holes which preferably facing a side or a bottom of the diffusion tower.

A method for purifying water includes the steps of providing a heated water stream including at least one non-volatile impurity, the heated water stream having a temperature above an ambient temperature. A heated water stream is sprayed onto a high surface area material, wherein thin films of water form on surfaces of the high surface area material. A low humidity air stream is forced over the thin films of water, wherein water from the thin films of water evaporates and diffuses into the low humidity air stream to create a humidified air stream. The humidified lair stream is then condensed to produce purified water. The non-volatile impurity can include at least one salt, wherein the method can comprise desalination. The spraying and forcing steps preferably take place in a diffusion tower.

A single body of water can be utilized to provide both the heated water stream and the cooling water stream. A single body of water can also be an exclusive source for the heated water stream. Waste heat from a power plant can also be used to provide heat to generate at least a portion of the heated water stream.

A diffusion tower for humidifying air includes a rigid outer shell, an inside volume of the shell including a portion filled with high surface area material. At least one inlet is provided for receiving a heated water stream, wherein at least one region having a thin film of water forms on the high surface area material. At least one inlet is provided for receiving a low humidity air stream, wherein the low humidity air stream is forced over the thin film of water, wherein water from the thin film evaporates and diffuses into the air stream to create a humidified air stream. At least one plenum is disposed near a top of the diffusion tower for drawing the humidified air stream out from the diffusion tower.

The plenum includes at least one inlet, the inlet at least in part facing a top of the diffusion tower. The structure for forcing an air stream over the thin film of water can comprise an air duct positioned near a bottom of the diffusion tower, the air duct including a plurality of holes, the plurality of holes facing a side or a bottom of the diffusion tower. The diffusion tower preferably provides a height to diameter ratio of at least 2.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
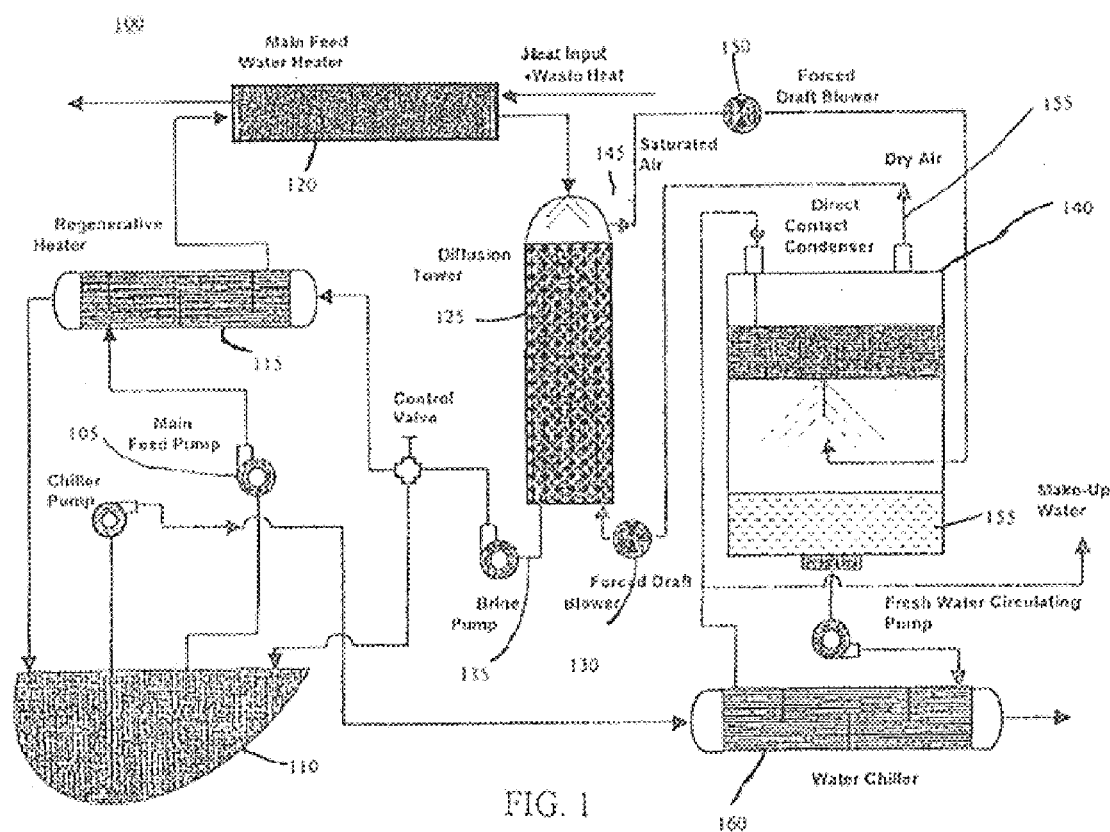
FIG. 1 is a flow diagram for a diffusion driven desalination system and process according to an embodiment of the invention.

The invention includes a Diffusion Driven Desalination (DDD) apparatus and process. The invention can provide efficiency advantages over conventional desalination technologies and is capable of providing large production rates of purified water. Although the preferred application for the DDD system is for desalination, the process can also purify water which includes other non-volatile contaminants, such as a variety of minerals including phosphates and nitrates, or metals including heavy metals.

The DDD process can utilize naturally occurring thermal energy storage provided by most large bodies of water, where desalination is most likely to be applicable. Because the desalination process can be accomplished at relatively low temperatures, inexpensive materials may be used for constructing a processing facility, and waste heat may be utilized to drive the desalination process, such as condensing steam from a nuclear or fossil fuel power plant which is a potential energy source which has been previously untapped. Accordingly, the invention can be operated using energy which can be provided at essentially no cost, thus making the inventive process significantly more economical when compared to other desalination processes.

Good performance of the process can be realized with an inlet feed water temperature as low as about 60° C. In certain applications, the desalination process may be driven without any heating of the inlet feed water, such as when there is a significant temperature gradient between the surface water, which can be drawn in as feed water, and the cooling water found at lower depths. When a significant thermal gradient exists in the feed water source utilized, desalination or purification can proceed without energy provided by any external heat source. Even when an external heat source is used, this feature of the invention allows the production efficiency (fresh water/feed water) of the DDD process to improve.

One important application for the invention involves placing a DDD plant on site at a steam driven electric generating plant, where the waste heat from condensing low pressure steam may be used to drive the desalination process. The ability to utilize waste heat from condensing low pressure steam results in significant efficiency advantages of the invention over conventional desalination technologies.

The following nomenclature is used in this detailed description:

| | |
|---|---|
| A | control surface area (m$^2$) |
| $C_{pa}$ | specific heat of air (kJ/kg) |
| h | enthalpy (kJ/kg) |
| $h_{fg}$ | latent heat of vaporization (kJ/kg) |
| $m_{II}$ | feed water mass flow rate (kg/s) |
| $m_a$ | air mass flow rate (kg/s) |
| $P_a$ | partial pressure of air (kPa) |
| $R_a$ | engineering gas constant for air (kJ/kg-K) |
| s | entropy generation rate in the diffusion tower (kW/K) |
| T | temperature (C. or K.) |
| V | control volume (m$^3$) |
| ω | humidity ratio |
| ρ | density |
| Subscripts | |
| a | air |
| fw | fresh water |
| l | water in liquid phase |
| v | water in vapor phase |

A simplified schematic diagram of the DDD process and system 100 is shown in FIG. 1. A main feed pump 105 draws water from a large body of water 110, such as seawater. The suction for pump 105 preferably draws water near the surface of the body of water 110 in order to draw the warmer water that normally resides in the vicinity of the surface due to thermal stratification, as compared to cooler water which resides at deeper depths beneath the surface. The surface water is optionally pumped through regenerative heater 115 as explained below and then fed to the main feed water heater 120. The amount of heat required to heat the feed water depends on the main feed water mass flow rate and desired production rate. The output temperature from the heater is generally relatively low, such as from 60 to 80° C. which can provide good performance. Therefore, the required heat input for the heater can be provided by a variety of sources.

The only requirement for the heat source(s) which heat the supply water is the ability to raise the temperature of the water stream to a temperature above the ambient temperature. Sources for heating can include heat from low pressure condensing steam in the main condenser of a steam driven power plant, waste heat derived from exhaust gases from a combustion engine such as a gas turbine or diesel engine, solar heating, or heat from a direct fossil fuel furnace or nuclear power plant. In addition, waste heat from another processing plant, such as a refinery or chemical production facility, would also generally be suitable for use with the invention.

Solar heating is particularly suitable for desert regions (e.g. Middle East) since solar heating generally requires a very large area to heat significant quantities of water. This might be economical in the Middle East or other locations where there is plenty of sun and inexpensive land.

After the feed water is heated in the main heater, it is sprayed onto the top of the diffusion tower 125. The diffusion tower 125 is an important piece of equipment in the process, and the degree to which an operational DDD process follows theoretically predicted models depends on an appropriately designed diffusion tower. On the bottom of the diffusion tower 125, low humidity air is pumped in, such as by a forced draft blower 130. The water sprayed into the top of the diffusion tower 125 falls countercurrently to the airflow through the diffusion tower the action of gravity. The diffusion tower 125 is preferably packed with very high surface area packing material, as would be found in a conventional air-stripping tower.

As water flows through the diffusion tower 125, a thin film of water forms on the surfaces of the packing material. The thin film of water is contacted by the air flowing upward through the tower 125 which is propelled by blower 130. As dictated by Fick's law of diffusion and the laws of conservation of mass, momentum, and energy, liquid water will evaporate and diffuse into the air, while air will diffuse into the water, both due to concentration gradients.

The diffusion tower 125 is preferably designed such that the air/vapor mixture leaving the tower should be fully saturated. The purpose of heating the water prior to entering the diffusion tower is that the rate of diffusion and the exit humidity ratio increases with increasing temperature, thus yielding greater water production. The water which is not evaporated in the diffusion tower 125 is preferably collected at the bottom of the tower and can be removed with a brine pump 135. The brine can be discharged or sent through a regenerative heater 115 for recovery of the heat above ambient possessed by the brine. Generally, when the brine temperature exceeds about 30° C. and/or when the brine temperature exceeds the incoming water temperature, the brine is preferably sent to a regenerative heater, otherwise it is preferably simply discharged. If it is expected the feed water temperature will not exceed about 30° C. or the brine temperature will not exceed the incoming water temperature, the regenerative heater 115 is generally not included with system 100. With appropriate maintenance it is not expected that scaling of the diffusion tower 125 will pose any significant problem since the brine will wash away residual minerals left behind by the evaporated water.

If the mineral concentration in the brine is high, there is the potential for scaling to occur on the packing material.

However, using operating conditions described herein, a low percentage (e.g. less than or equal to 11%) of the feed water is evaporated which will result in a low mineral concentration in the brine making scaling of the packing material only generally a minimal concern.

The air entering the diffusion tower 125 is preferably dry air. Air can be dried in a direct contact condenser 140 for this purpose. The saturated air/vapor mixture leaving the diffusion tower 145 is drawn into a direct contact condenser 140 with a forced draft blower 150, where the water vapor is condensed into fresh water that is collected in the sump 155 of condenser 140.

It may be possible to use types of condensers other than the direct contact type. However, due to the presence of non-condensable gas (air) mixed with the water vapor, a traditional shell and tube condenser would generally require excessive heat transfer area. Thus, it is anticipated that a direct contact condenser will yield the highest heat transfer efficiency of the available condenser types.

The air stream exiting the condenser is preferably dehumidified by the condenser cooling water (not shown) and is indicated as dry air 155. The condenser 140 can run in either a recirculating or non-recirculating (open) mode. In the recirculating mode, prior to being re-circulated back through the condenser the dry air stream 155 is preferably heated back to or near ambient temperature. This can be accomplished by 1) not insulating the return line back to the diffusion tower, 2) not insulating the return line back to the diffusion tower 125 and putting (heating) fins on the non-insulated line to enhance heat transfer with the assumed warmer ambient, or 3) running the dry air 155 through a heat exchanger (not shown) to pick up heat from sources including the ambient.

If system 100 operates in a region where there is an abundance of dry air (low humidity), such as a desert, the non-recirculating (open) mode may be a preferred operating mode. Although not shown in FIG. 1, in the open mode dry air is drawn into the diffusion tower 125 from the ambient and the dry air 155 exiting condenser 140 is discharged to the environment.

A difficulty which can arise is that film condensation heat transfer can be substantially degraded in the presence of non-condensable gas. This difficulty was faced in the design and development of condensers for OTEC (Ocean Thermal Energy Conversion) applications and the solutions to the same may be used with the invention. For example, in order to overcome this problem Bharathan et al. (1988) discloses use of direct-contact heat exchangers. In their report, development of models is disclosed for simulating the heat transfer. Bharathan et al. have also been awarded U.S. Pat. No. 5,925,291 for an invention entitled "Method and apparatus for high-efficiency direct contact condensation."

For the present invention which primarily involves desalination, the warm fresh water discharging the direct contact condenser 140 is preferably chilled using a conventional shell-and-tube heat exchanger 160 using saline cooling water. The cooling water can be drawn from a large depth from the body of water 110 to take advantage of the thermal stratification generally present in large bodies of water. A portion of the chilled fresh water can be directed back to the direct contact condenser 140 to condense the water vapor from the saturated air/vapor mixture 145 which discharges from the diffusion tower 125. The rest of the fresh water supplied from the condenser 140 is fresh make-up water, make-up water being fresh potable water ready to be consumed or stored. Preferably, a supply of fresh potable water tanks will be located on site for storage of fresh water produced. It is anticipated that the fresh water produced will generally be transferred via pipeline to municipalities or industries for consumption.

Figure 2:
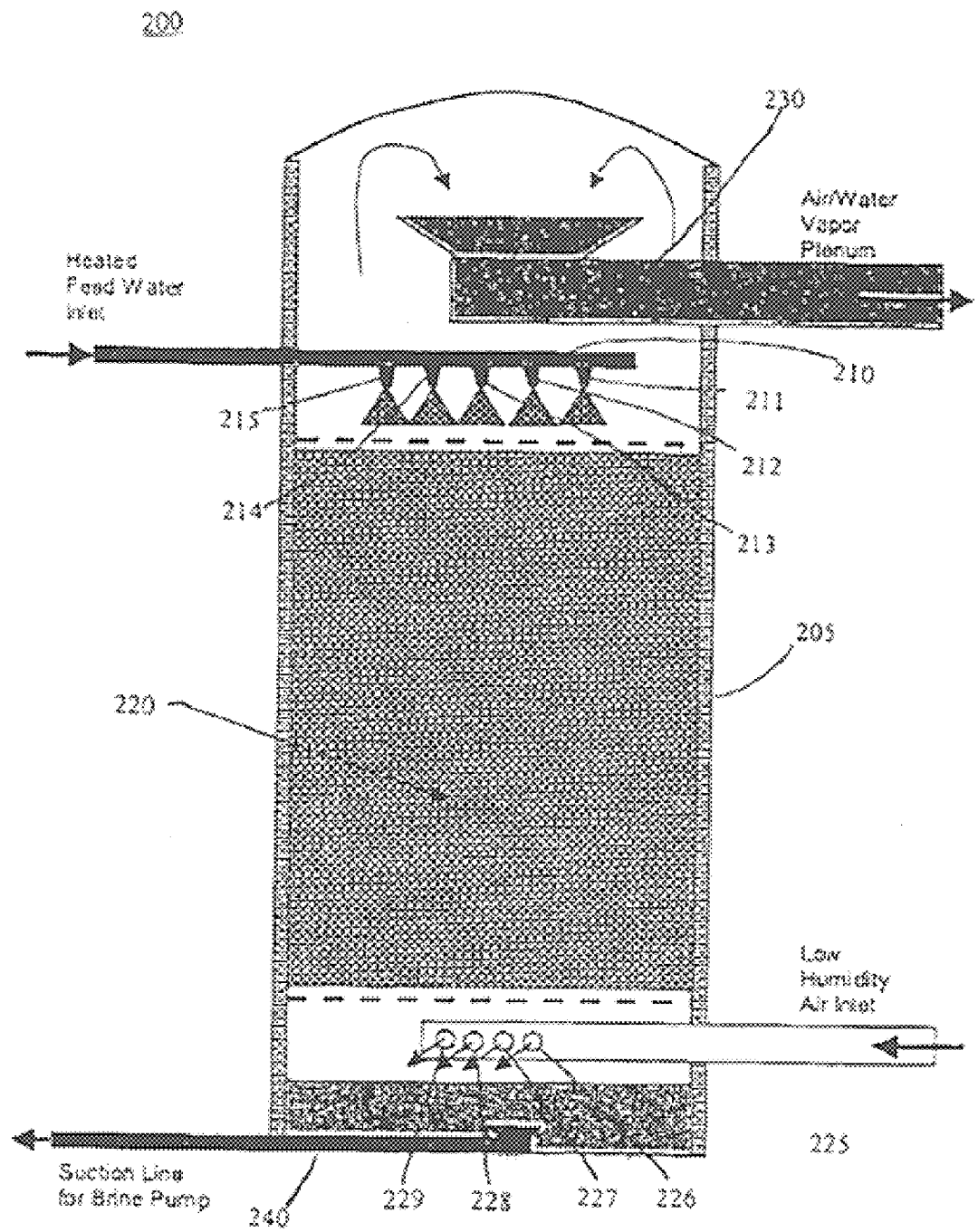
FIG. 2 is a cross sectional view of an exemplary diffusion tower, according to an embodiment of the invention FIG. 3. illustrates examples of different types of high surface area packing materials that may be used with the invention.

A cross-sectional view of a simplified exemplary diffusion tower 200 is shown in FIG. 2. The outer shell of the diffusion tower 205 is preferably constructed using a mechanically strong material, such as steel-reinforced concrete. Heated feed water is pumped to a distribution header 210 having a plurality of spray heads 211–215 located near the top of the diffusion tower. The water is sprayed uniformly over high surface area packing material 220. It is desirable to have a uniform water spray because the system efficiency is enhanced by a uniform spray. In addition, the heat and mass transfer analysis used to size the diffusion tower assumes a uniform water flow over the packing material 220.

Diffusion tower 200 preferably provides a minimum height to diameter ratio to provide high efficiency. For example, it is recommended that the height to diameter ratio of diffusion tower 200 be at least 2, and more preferably at least 10.

Low humidity air is blown into the diffusion tower through an air duct 225 positioned near the bottom of the tower. The low humidity air is blown out of a duct having openings 226–229 oriented transverse to the height of the tower. This arrangement is preferably provided so that the falling water does not enter the air duct discharge which supplies the low humidity air to diffusion tower 200. The air travels up through the packing material to the top of the tower. As the air rises through tower 200 it is both heated and humidified.

Brine collects at the bottom of the diffusion tower 200, and is preferably pumped out with a brine pump (not shown) via suction line 240. The air/water vapor mixture which rises to the top of tower 200 is preferably drawn out of the tower through a plenum 230 or similar structure. The plenum is preferably designed so that the air/water vapor mixture must turn 180 degrees (i.e. enter at the top of plenum 230) in order to enter plenum 230 as shown in FIG. 2. This arrangement will minimize entrained liquid droplets from entering plenum 230.

Figure 3:
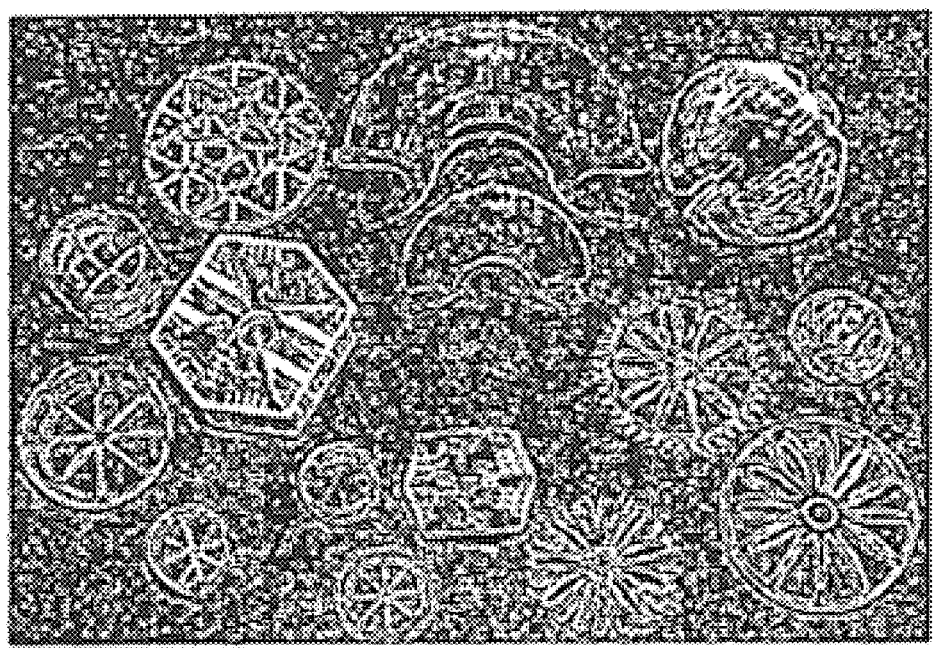

Different types of commercially available high surface area packing material 220 may be used with the diffusion tower. FIG. 3 shows examples of some materials that may be used for this purpose. These packing materials are usually formed from polymers such as polyethylene, which is suitable for the low temperature operation of the diffusion tower. Typically, a manufacturer of packing material will provide specifications regarding the surface area per unit volume. Preferred materials provide high surface area per unit volume ratios, such as at least 100 $m^2/m^3$.

The height for the diffusion tower can be calculated by first choosing the tower diameter. The diameter can be chosen such that the air flow over the packing material will be in the turbulent flow regime. More than one diffusion tower might be required to achieve the desired design flow conditions.

A packing material with a desired surface area per unit volume is then specified. A heat and mass transfer analysis is done concurrently to determine the required tower height to achieve the design exit temperature and exit humidity ratio. Once the required height of the diffusion tower is known, a hydrodynamic analysis is done to determine the pressure drop through the tower, which will allow the size of the forced draft blowers to be specified.

The DDD system and method is distinct as compared other desalination processes, such as the carrier gas process (CGP) system and method. One of the major differences is that in CGP heat is added to the system after water diffuses into the air, and a common heat transfer wall is used for both heating and condensation. The use of the common heat transfer wall significantly reduces the area available for heat transfer compared with the packed diffusion tower and direct contact condenser. Therefore it is expected that the DDD process will have a greater production efficiency than the CGP process. In addition, the CGP process does not recirculate the air. This will pose a significant penalty when operating in hot and humid climates since the relative humidity of the incoming air will be very high. Significant heating would be required for the air to carry more water vapor. The DDD process can also make use of the thermal stratification in sea water while the CGP process cannot.

The DDD system and method is also distinct as compared to the Humidification Dehumidification (HDH) system and method. In the DDD process, the evaporation occurs in a diffusion tower as opposed to the cooling tower used in HDH. The diffusion tower is packed with high surface area packing material, and provides significantly greater surface area than an HDH cooling tower for the same tower size. This is important because the rate of water evaporation is directly proportional to the liquid/vapor surface area available. Thus, a diffusion tower is capable of a much higher rate of diffusion and thus greater fresh water production efficiency as compared to an HDH cooling tower.

Based on the considerations above, under the same operating conditions, the DDD process should have significantly greater water production efficiency (kilograms of fresh water per kilogram of feed water) as compared to the HDH process.

The overall DDD based desalination process requires energy consumption that is comparable to the energy required for flash distillation and reverse osmosis. However, a major advantage of the DDD process is that it can operate at low temperatures so that it can be driven by an energy input which has low thermodynamic availability. This is important because the process can be driven by waste heat that would otherwise not be suitable for doing useful work or driving some other distillation process, such as flash distillation. Accordingly, the invention can be operated at least in significant part using energy which is provided at essentially no cost, thus making the inventive process significantly more economical when compared to other desalination processes.

An important application for the DDD process is to operate in conjunction with an existing process that produces large amounts of waste heat and is located in the vicinity of salt water, such as an ocean or a sea. One such potential benefactor of the DDD process is the electric or utility industry. Conventional steam driven power plants dump a considerable amount of energy to the environment via cooling water that is used to condense low pressure steam within the main condenser. Typically this cooling water is either discharged back to its original source or it is sent to a cooling tower, where the thermal energy is discharged to the atmosphere. Instead of dumping the thermal energy to the environment, the DDD process can utilize the otherwise discarded thermal energy to produce fresh water.

The invention can be efficiently applied to power producing facilities sited along the coastline, or along a salt or brackish water containing body of water. This permits application at many power producing facilities because the geographical distribution of fossil fired power plants and nuclear power plants built in the United States and in some other industrialized parts of the world are generally proximate to large bodies of water and nearby large population bases. The demographic make-up of the United States as well as other industrialized nations is such that major population centers generally reside along the coastline. Thus, the DDD process appears to be well suited for the power generation infrastructure in the United States as well as certain locations abroad.

As an example, it has been estimated that a 100 MW steam driven power plant operating with 2" Hg vacuum in the main condenser could provide approximately 140 MW of energy at 93° C. available from low pressure condensing steam (El-Walkil, 1984). If such a power plant is retrofitted or otherwise designed to operate with a DDD plant, there is the potential to produce as much as 18 million gallons of fresh water over a 24 hour period, assuming the DDD process energy consumption to be 0.05 kWh/kg$_{fw}$. The low temperature operation of the DDD process is economically advantageous in that inexpensive materials may be used to construct a facility. Since the energy required to drive the DDD process would be free to an electrical utility, it is anticipated that the capital investment required to fabricate a DDD plant could be readily recovered by selling fresh water to local industry and municipalities.

Although there exists some optimum air to feed water flow ratio that will minimize the energy consumption, this may not be the most economical operating condition when the DDD process is driven by waste heat. The reason is that a higher air flow rate requires more pumping power, which must be supplied to forced draft fans via electricity. Since electricity is a valuable commodity it may be more economical to operate with a higher exit air temperature and a lower air to feed water flow ratio (lower electricity consumption) since the thermal energy driving the DDD process is waste heat that would otherwise be discarded. An economic analysis, which is not considered here, may be required to identify the optimum operating conditions based on cost considerations.

EXAMPLES

The present invention is further illustrated by the following specific examples. The examples are provided for illustration only and are not to be construed as limiting the scope or content of the invention in any way.

In order to explore the performance and parametric bounds of an exemplary DDD process, a thermodynamic cycle analysis has been performed by considering a system similar to system 100 shown in FIG. 1. In performing the analysis the following assumptions were made:

1. The process operates at steady-state conditions.
2. There are no energy losses to the environment from the heat and mass transfer equipment.
3. Air and water vapor may be treated as a perfect (ideal) gas.
4. Changes in kinetic and potential energy are relatively small.
5. The pumping power is neglected in the energy balance.

In the analysis performed, the temperature of the feed water drawn into the main feed pump was fixed at 27° C. It was also assumed that a large supply of cool water will be available at a sink temperature, $T_L$, of 15° C. The condensate in the direct contact condenser was chilled and a portion of it re-circulated. To avoid providing specifics on the heat transfer equipment, it is assumed that the heat transfer effectiveness in the chiller and condenser is unity, in which case $T_L = T_5 = T_7 = 15°$ C. The temperature of the feed water leaving the main heater is the high temperature in the system, $T_H = T_1$, and is a primary controlling variable for the process. Different performance curves will be shown for a variable $T_H/T_L$.

The air/vapor mixture leaving the diffusion tower is assumed to be fully saturated (relative humidity of unity), and due to heat transfer limitations, its maximum temperature will be taken to be that of the feed water entering the diffusion tower ($T_4 = T_1$).

The main purpose of this analysis is to explore the performance bounds of the DDD process. However, specification of the system operating variables is not arbitrary. Namely, there are two constraints that must be satisfied, the brine temperature leaving the diffusion tower must not freeze ($T_2 > 0°$ C.), and the net entropy generation in the diffusion tower must be positive.

These constraints govern the parametric bounds for the diffusion tower operation. While the first constraint is initially obvious, the second constraint is simply a restatement of the second law of thermodynamics for the present adiabatic system (diffusion tower). The control volume formulation of the second law of thermodynamics for an open system is expressed as, $$\frac{Ds}{Dt} = \frac{\partial}{\partial t}\int_V \rho s \, dV + \oint_A \rho s \vec{v} \cdot d\vec{A} \geq \oint_A \frac{1}{T}\frac{\dot{Q}}{A} dA, \quad (1)$$

where V denotes the control volume, $\rho$ is the density, A is the control surface, and s is the entropy per unit mass. Assuming steady state processing of fresh water, the adiabatic diffusion tower assumption leads to, $$\dot{s} = \frac{Ds}{Dt} = \oint_A \rho s \vec{v} \cdot d\vec{A} \geq 0, \quad (2)$$

and $$\dot{s} = m_{12}s_{12} + m_a s_{a4} + m_{v4}s_{v4} - m_{l1}s_{l1} - m_a s_{a3} - m_{v3}s_{v3} \quad (3)$$

where m denotes the mass flow rate and the subscripts l, a and v respectively refer to the liquid, air, and vapor phases. The numerical subscripts denote that the property is evaluated at the state corresponding to the position in the process as shown schematically in FIG. 1. Conservation of mass dictates that, $$\frac{m_{12}}{m_a} = \frac{m_{l1}}{m_a} - (\omega_4 - \omega_3). \quad (4)$$

The rate of entropy generated in the diffusion tower per rate of air flow, which must be positive, is obtained from rearranging Eq. (3) and combining with Eq. (4) as, $$\frac{\dot{s}}{m_a} = \left[\frac{m_{l1}}{m_a} - (\omega_4 - \omega_3)\right]s_{12} + \quad (5)$$
$$C_{pa}\ln\left(\frac{T_4}{T_3}\right) - R\ln\left(\frac{P_{a4}}{P_{a3}}\right) + \omega_4 s_{v4} - \omega_3 s_{v3} - \frac{m_{l1}}{m_a}s_{l1}.$$

where $\omega$ is the humidity ratio, $C_p$ is the specific heat, R is the engineering gas constant, and $P_a$ is the partial pressure of air.

The control volume formulation of energy conservation applied to the adiabatic diffusion tower leads to, $$m_{l1}h_{l1} + m_a h_{a3} + m_{v3}h_{v3} - m_{l2}h_{l2} - m_a h_{a4} - m_{v4}h_{v4} = 0 \quad (6)$$

where h denotes the enthalpy. The enthalpy of the brine exiting the diffusion tower is obtained from Eqs. (6) and (4) as, $$h_{l2}(T_2) = \frac{\frac{m_{l1}}{m_a}h_{l1} - C_{pa}(T_4 - T_3) + \omega_3 h_{v3} - \omega_4 h_{v4}}{\frac{m_{l1}}{m_a} - (\omega_4 - \omega_3)}, \quad (7)$$

and the brine temperature ($T_2$) is evaluated from the enthalpy. The ratio of the feed water to air flow through the diffusion tower, $$\frac{m_{l1}}{m_a},$$

is another controlling variable in the analysis. For all computations the feed water flow rate will be fixed at 1 kg/s while the air flow rate will be varied.

The humidity ratio entering the diffusion tower, $\omega_3$, is determined by recognizing that it is the same as the humidity ratio exiting the condenser, where $T_7$ is 15° C. Prior to entering the diffusion tower, the air/vapor mixture is convectively heated by the ambient as it is pumped back to the diffusion tower. This may be achieved by placing fins on the return line to the diffusion tower. Taking the ambient temperature to be 25° C., it follows that $T_3 = 25°$ C. and $\omega_3 = \omega_7$.

Figure 4:
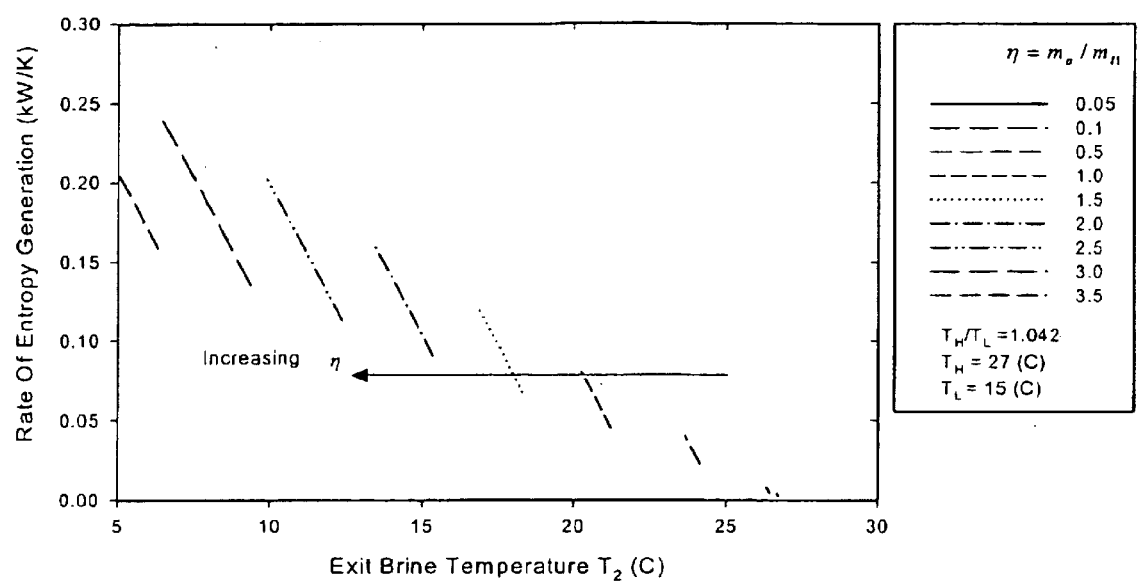
FIG. 4 illustrates the rate of entropy generation in the diffusion tower for $T_H=27°$ C.

The first case considered is where there is no heating in the main heater. The desalination process is entirely driven by the difference in temperature of the feed water drawn at shallow depths and the cooling water drawn at more substantial depth. In this case, $T_H/T_L = 1.04$. FIG. 4 shows the rate of entropy generation within the diffusion tower and the brine temperature exiting the diffusion tower for a locus of possible operating conditions. It is observed that the second law thermodynamics is satisfied for the entire parametric range considered. At the highest air to feed water flow ratio more fresh water production is possible, but there is a lower limit beyond which the exit brine will freeze.

Figure 5:
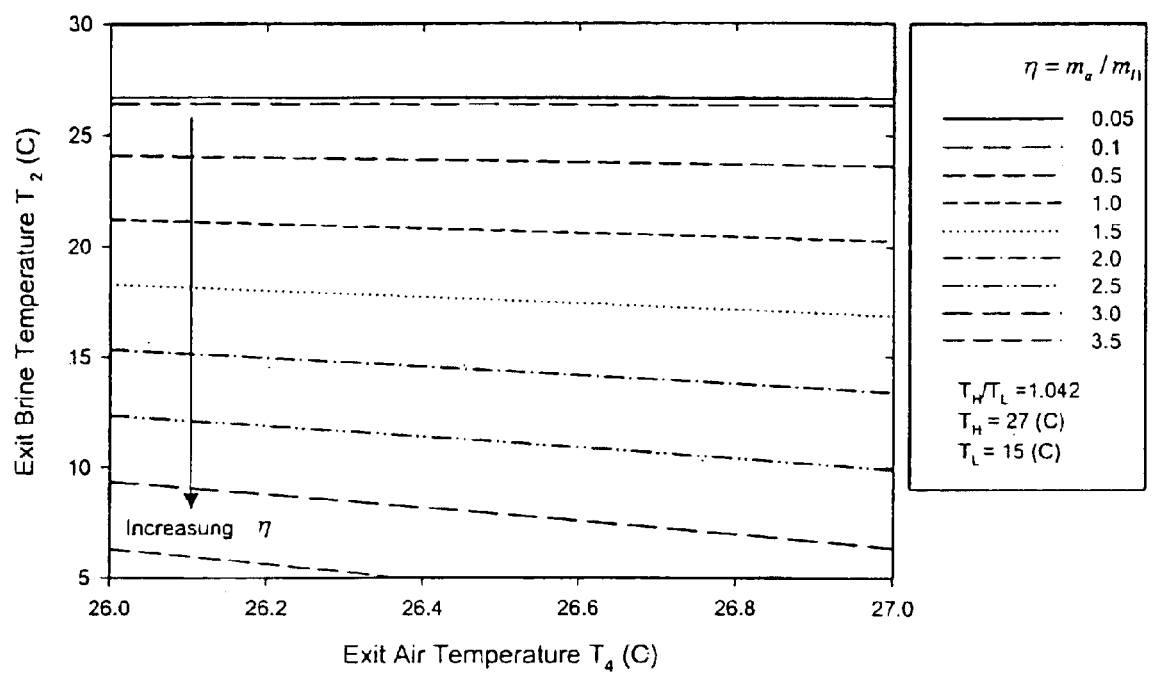
FIG. 5 illustrates the variation of exit brine temperature with exit air temperature for $T_H=27°$ C.

FIG. 5 shows the brine temperature ($T_2$) exiting the diffusion tower as a function of the exit air temperature from the diffusion tower ($T_4$) for the same locus of operating conditions as in FIG. 4. It is advantageous to have a high air temperature leaving the diffusion tower so that the humidity ratio and fresh water production rate are as high as possible. For this case the exit air temperature is primarily constrained by the inlet feed water temperature ($T_1$). Due to heat transfer considerations it would be impractical to design the diffusion tower such that $T_4$ exceeds $T_1$. Thus in this analysis, the exiting air temperature from the diffusion tower does not exceed the inlet feed water temperature.

Figure 6:
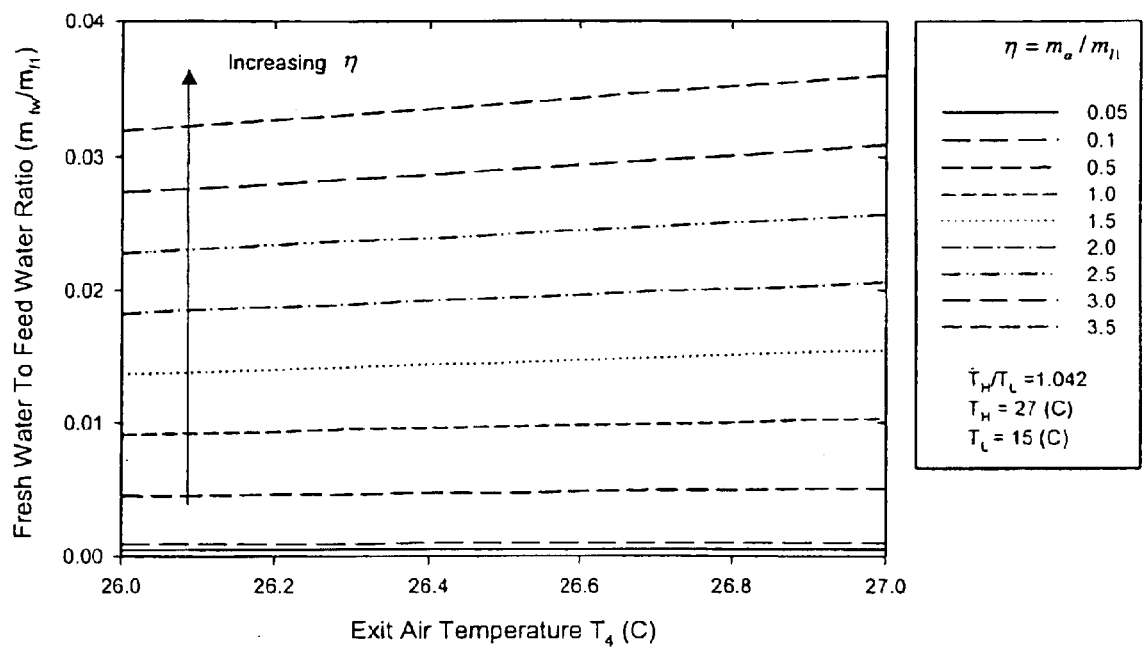
FIG. 6 illustrates the fresh water production efficiency for $T_H=27°$ C.

FIG. 6 shows the ratio of fresh water production rate to the inlet feed water rate as a function of the exit air temperature for different air to feed water flow ratios. Clearly, the production rate increases with increasing exit air temperature and increasing air to feed water flow ratios. However, both these parameters are constrained, and for the case of no heating of the feed water ($T_H/T_L = 1.04$), the maximum fresh water production efficiency ($m_{fw}/m_{l1}$) is approximately 0.035.

Figure 7:
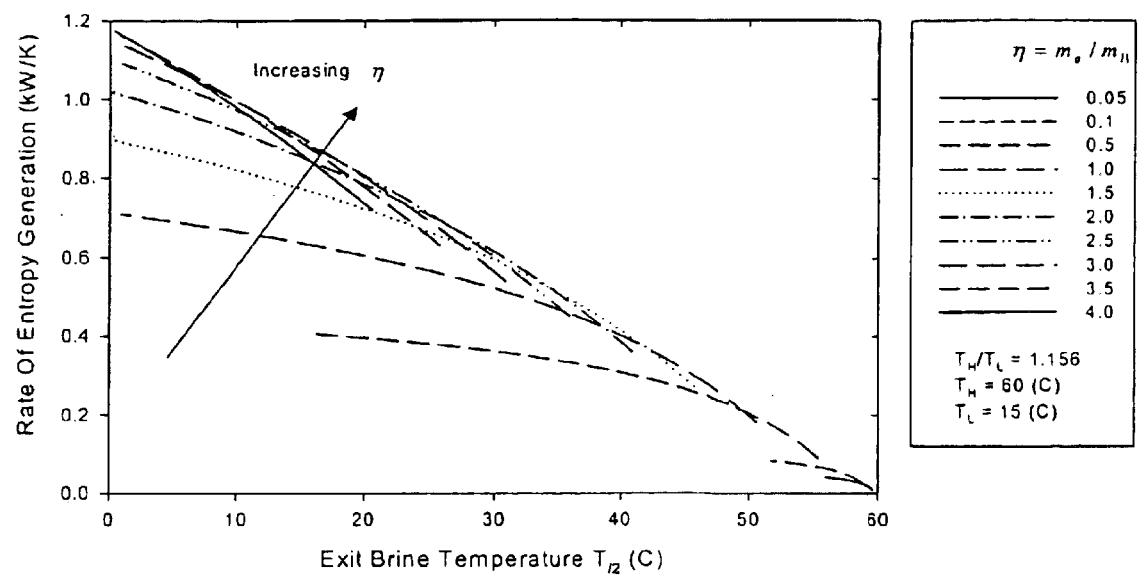
FIG. 7 illustrates the rate of entropy generation in the diffusion tower for $T_H=60°$ C.
Figure 8:
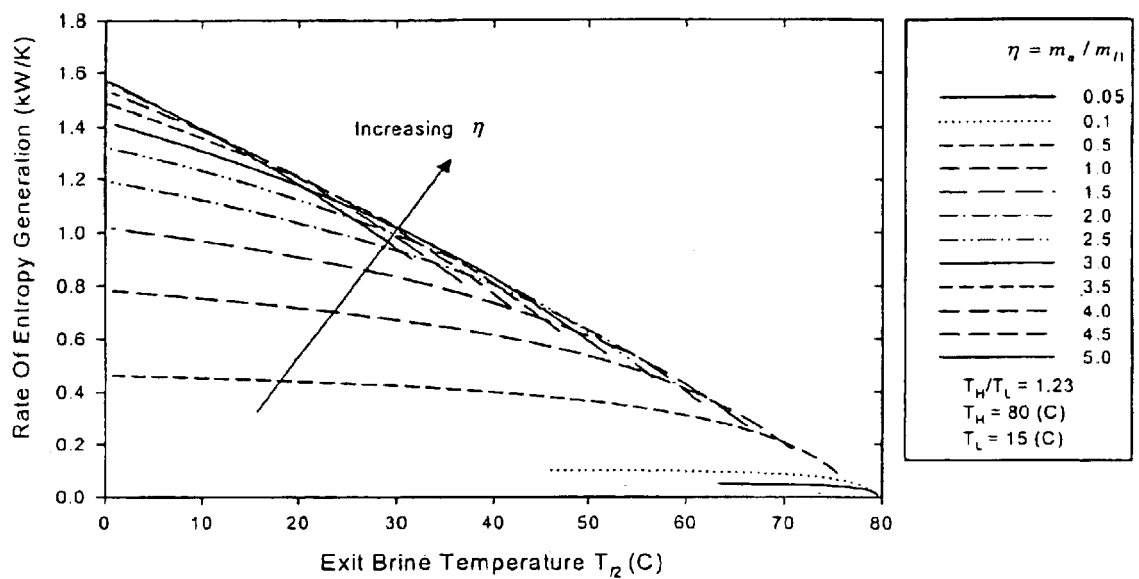
FIG. 8 illustrates the rate of entropy generation in the diffusion tower for $T_H=80°$ C.
Figure 9:
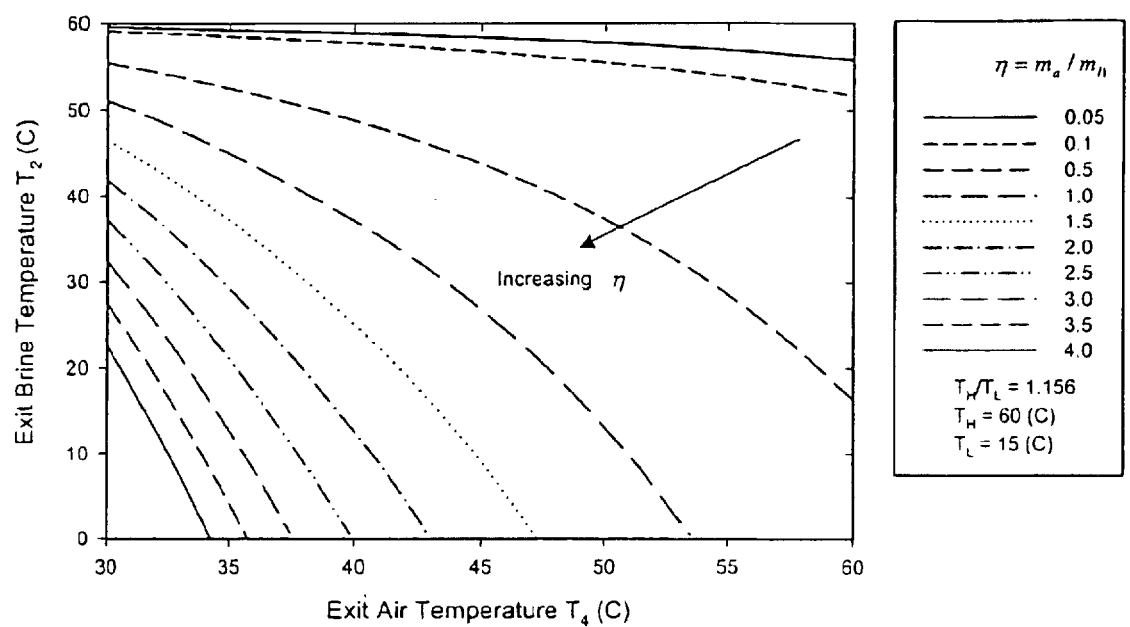
FIG. 9 illustrates the variation of exit brine temperature with exit air temperature for $T_H=60°$ C.
Figure 10:
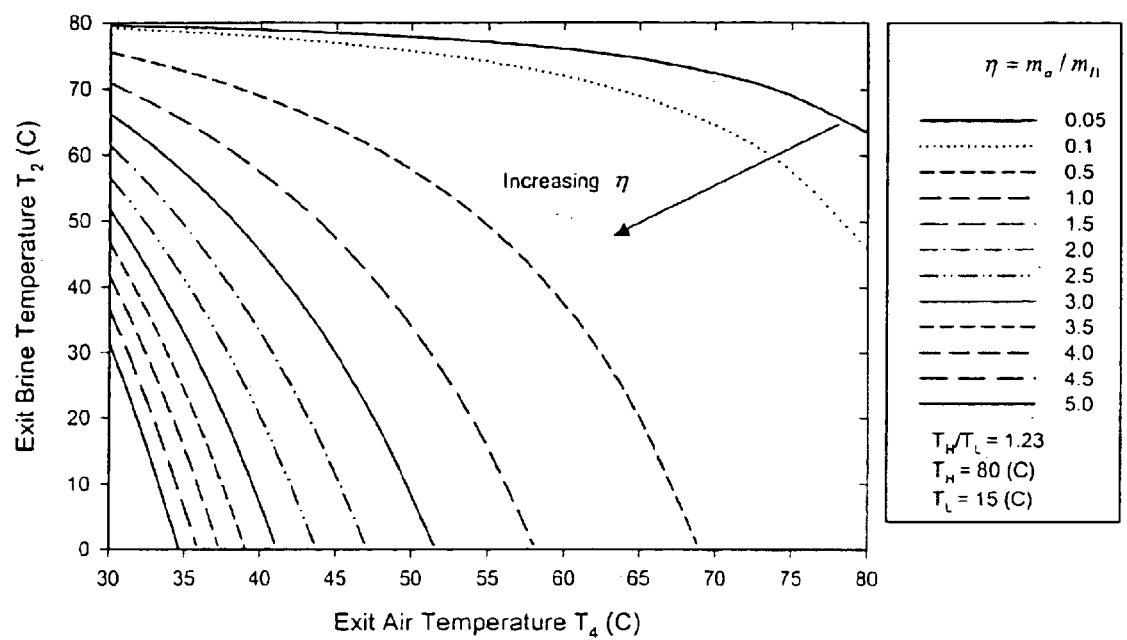
FIG. 10 illustrates the variation of exit brine temperature with exit air temperature for $T_H=80°$ C.

The next cases considered are where the diffusion tower inlet water temperatures are 60° C. and 80° C. which correspond to $T_H/T_L = 1.17$ and 1.23, respectively. FIGS. 7 and 8 show the rate of entropy generation in the diffusion tower for $T_H/T_L = 1.17$ and 1.23, respectively. Again the second law of thermodynamics is satisfied for the entire parametric range considered. The entropy generation tends to be lower for lower air to feed water flow ratios and higher exit brine temperatures. At higher air to feed water flow ratios, the constraint is that the brine does not freeze. FIG. 9 shows the range of possible exit brine temperatures and exit air temperatures for different air to feed water flow ratios when the diffusion tower inlet water temperature is 60° C. ($T_H/T_L$=1.17). FIG. 10 shows the range of temperatures when the diffusion tower inlet water temperature is 80° C. (($T_H/T_L$=1.23). The maximum fresh water production will occur with as high an exit air temperature as possible. In order to satisfy an energy balance on the diffusion tower, the exit brine temperature decreases with increasing exit air temperature. In contrast to the case with no heating, the exit air temperature is primarily constrained by the fact that the brine cannot freeze, especially at higher air to feed water flow ratios. At very low air to feed water flow ratios and $T_L$=60° C. and 80° C., the exit air temperature is generally constrained by the inlet water temperature.

Figure 11:
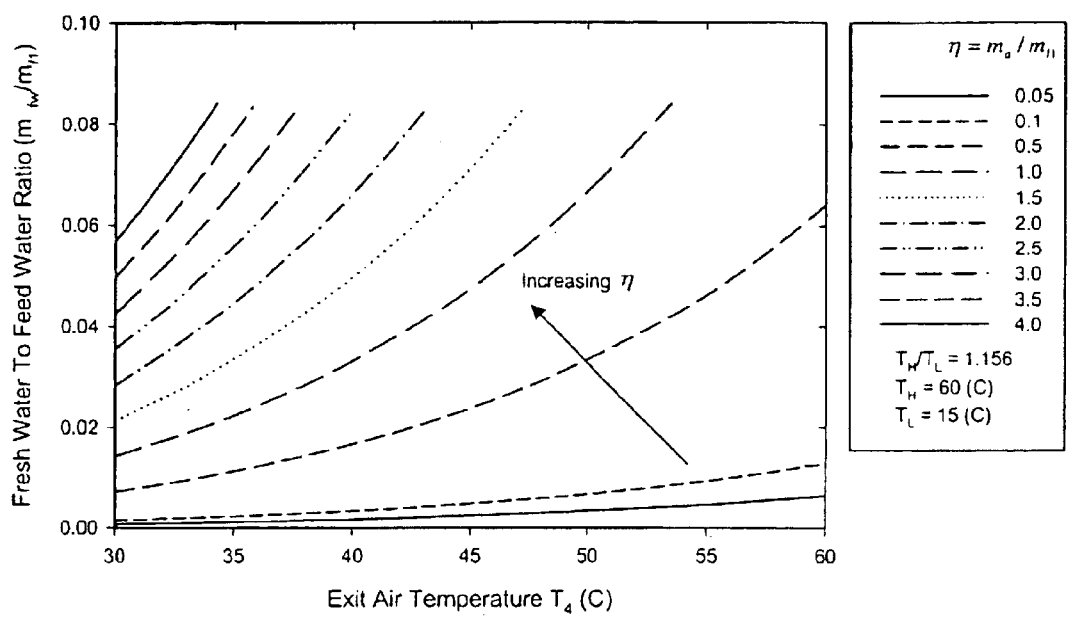
FIG. 11 illustrates the fresh water production efficiency for $T_H=60°$ C.
Figure 12:
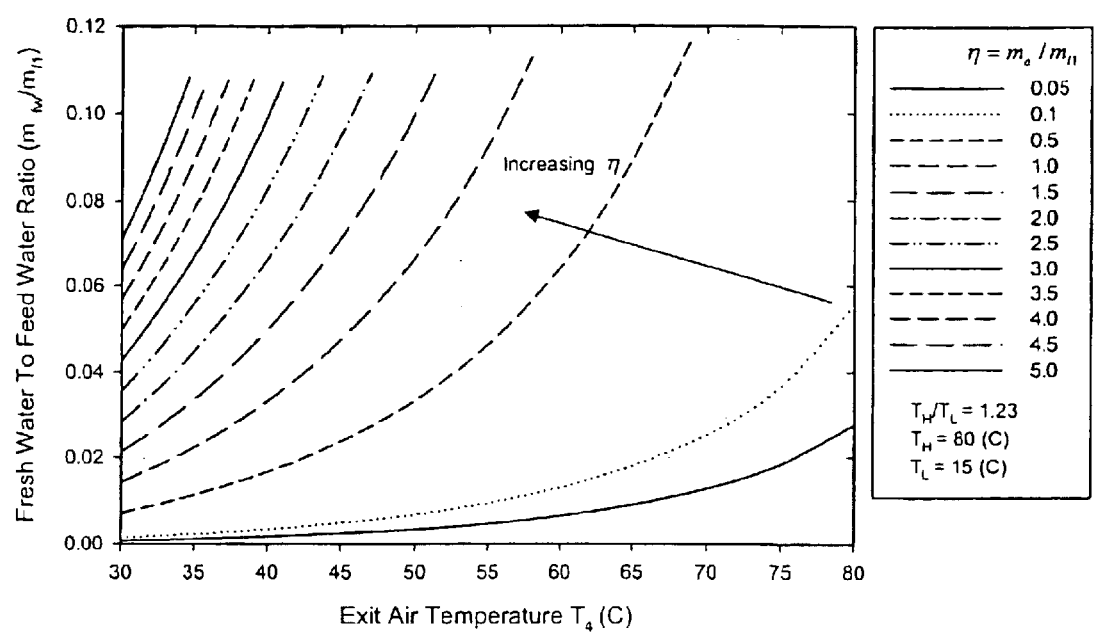
FIG. 12 illustrates the fresh water production efficiency for $T_H=80°$ C.

For respective diffusion tower inlet water temperatures of 60° C. and 80° C., FIGS. 11 and 12 show the ratio of fresh water production to the inlet feed water flow rate as a function of the exit air temperature for different air to feed water flow ratios. It is observed that the fresh water production efficiency increases with increasing exit air temperature and increasing air to feed water flow ratio. The maximum fresh water production efficiency for $T_1$=60° C. is approximately 0.08, while that for $T_1$=80° C. is approximately 0.11. Therefore, one advantage of in creasing the diffusion tower inlet water temperature is that the fresh water production efficiency increases.

Figure 13:
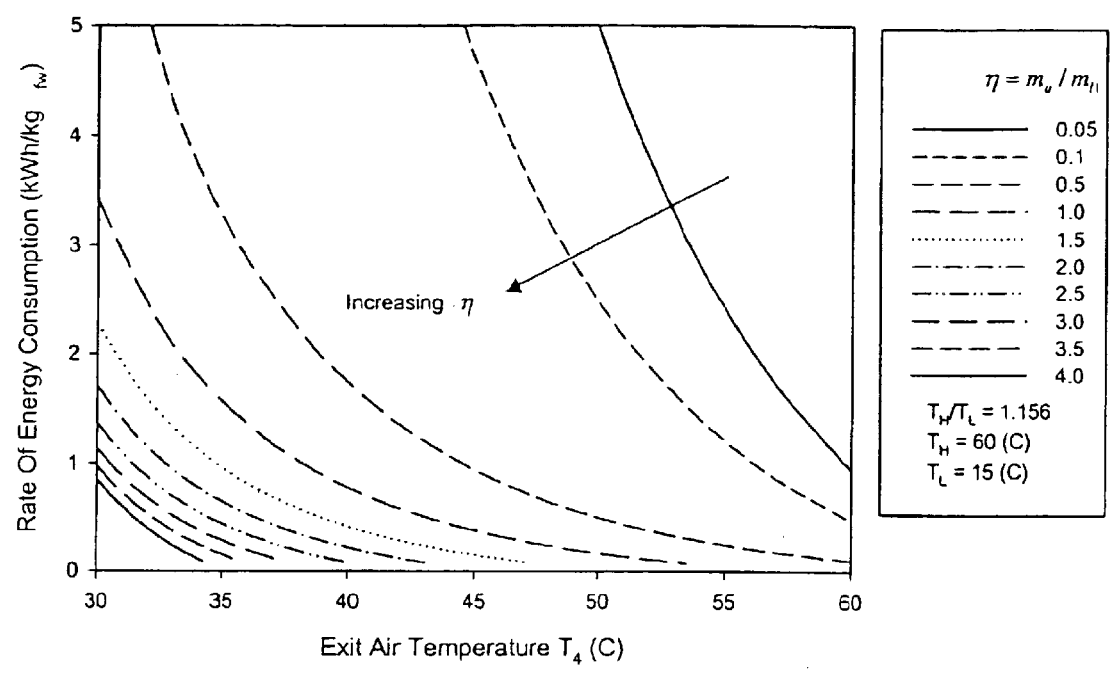
FIG. 13 illustrates the rate of energy consumption for $T_H=60°$ C.
Figure 14:
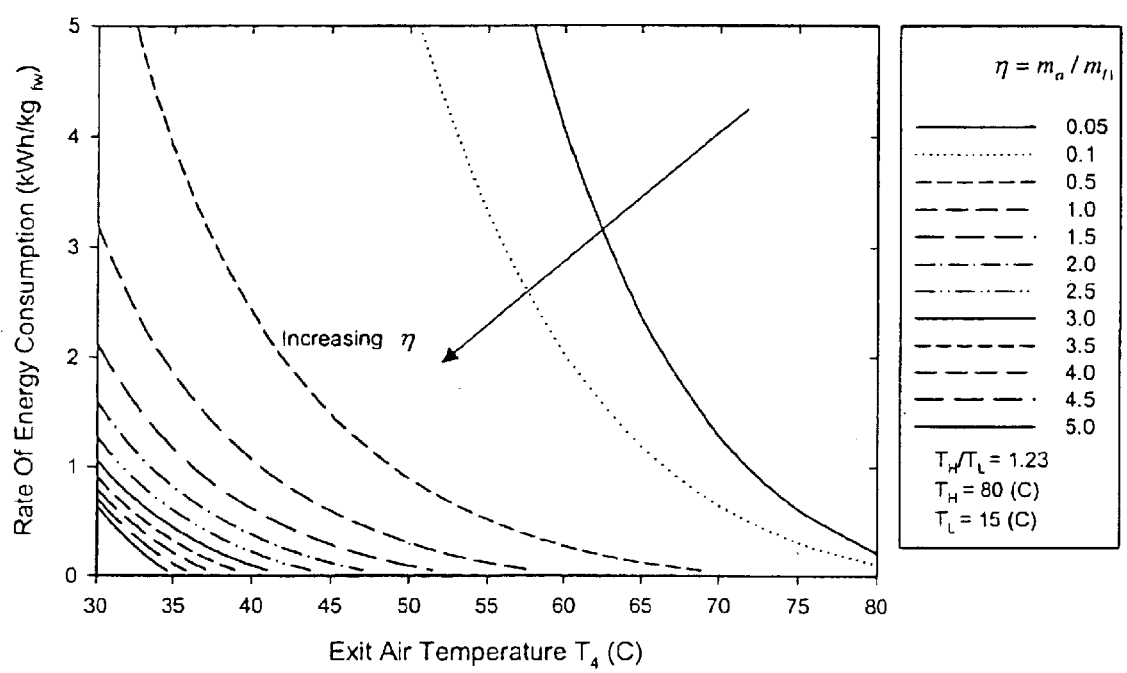
FIG. 14 illustrates the rate of energy consumption for $T_H=80°$ C.
Figure 15:
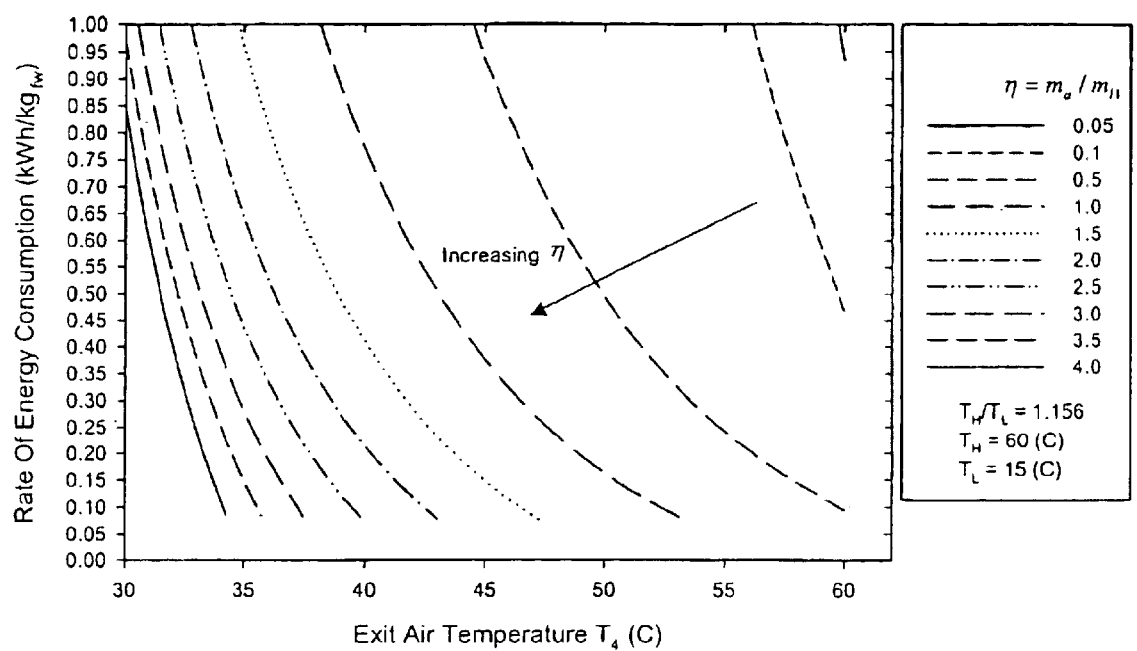
FIG. 15 illustrates the rate of energy consumption on magnified scale for $T_H=60°$ C.
Figure 16:
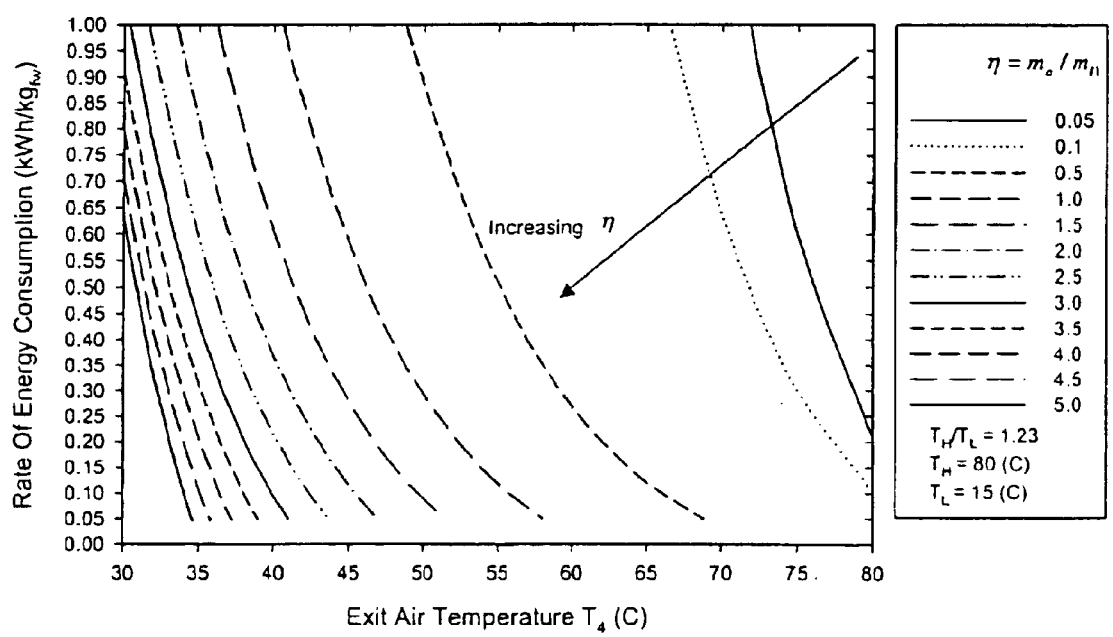
FIG. 16 illustrates the rate of energy consumption on magnified scale for $T_H=80°$ C.

For respective diffusion tower inlet water temperatures of 60° C. and 80° C., FIGS. 13 and 14 show the energy consumed per unit of fresh water production as a function of exit air temperature for different air to feed water flow ratios over the entire parameter space considered. Although, details of the low energy consumption regime are difficult to discern, it is interesting to observe that increasing both the exit temperature and the air flow results in a reduced rate of energy consumption. In order to explore the lower energy consumption regime FIGS. 15 and 16 have been prepared for diffusion tower inlet water temperatures of 60° C. and 80° C., respectively.

For $T_1$=60° C. the lower limit on energy consumed per unit of fresh water production is about 0.06 kWh/kg$_{fw}$, while that for $T_1$=80° C. is approximately 0.05 kWh/kg$_{fw}$. In this analysis the energy consumption due to pumping is neglected, and the current results suggest that the energy consumption is lower with higher air to feed water flow ratios. However, with higher air flow, the pumping power required will increase as well. Therefore, it is expected that in actual practice there is some minimum energy consumption associated with a specific air to feed water flow ratio that is less than the maximum flow. The inclusion of the pumping power in the overall analysis is the subject of a future investigation.

It is also of interest to compare the fresh water production and energy consumption between the cases of $T_1$=60° C. and 80° C. There is only marginal improvement in the fresh water production and energy consumption when increasing $T_H$ from 60° C. to 80° C. This demonstrates that the DDD process is best suited for applications where the waste heat driving the process has low thermodynamic availability.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The following literature citations as well as those cited above are incorporated by reference herein for the reasons cited in the above text:

Al-Hallaj, S., Farid, M. M., and Tamimi, A. R., 1998, "Solar desalination with a humidification-dehumidification cycle: performance of the unit," *Desalination*, Vol. 120, Issue 3, pp. 273–280.

Assouad, Y., and Lavan, Z., 1988, "Solar desalination with latent heat recovery," *Journal of Solar Energy Engineering*, Vol. 110, Issue 1, pp. 14–16.

Bharathan, D., Parsons, B. K., and Althof, J. A., 1988, "Direct-Contact Condensers for Open-Cycle OTEC Applications," *National Renewable Energy Laboratory Report SERI/TP*-252-3108 for DOE Contract No. DE-AC02-83CH10093.

Bharathan, D., Parent, A., and Hassani, A. V., 1999, "Method and Apparatus for High-Efficiency Direct Contact Condensation," U.S. Pat. No. 5,925,291.

Bourouni, K., M. Chaibi, M. T., and Tadrist, L., 2001, "Water desalination by humidification and dehumidification of air: State of the art," *Desalination*, Vol. 137, Issues 1–3, pp. 167–176.

Bullard, C. W. and Klausner, J. F., 1987, "Empirical Analysis of Power Plant Siting," *Energy Systems and Policy*, Vol. 11, pp. 103–120, 1987.

Larson, R. L., Albers, W., Beckman, J., and Freeman, S., 1989, "The carrier-gas process—a new desalination and concentration technology, *Desalination*, Vol. 73, pp. 119–137.

*Seawater Desalination in California,* 1999, a report by the California Coastal Commission.

We claim:

1. An apparatus for purifying water, comprising:
  a diffusion tower for receiving a heated water stream including at least one impurity and creating at least one region having a thin film of water from said heated water stream, said heated water stream having a temperature above ambient temperature;
  structure for forcing a low humidity air stream over said thin film of water, wherein water from said thin film of water evaporates and diffuses into said low humidity air stream to create a humidified air stream, and
  at least one direct contact condenser in fluid communication with said humidified air stream for condensing said humidified air stream, wherein purified water is produced.

2. The apparatus of claim 1, wherein said heated water stream is heated by at least one heat exchanger.

3. The apparatus of claim 1, wherein heat to produce said heated water stream is supplied by at least one source selected from the group consisting of low pressure condensing steam from a power plant, waste heat from a combustion engine, and geothermal heat.

4. The apparatus of claim 1, wherein said humidified air stream flows countercurrent to a direction of said heated water stream.

5. The apparatus of claim 1, further comprising a heat exchanger in fluid communication with an output of said direct contact condenser for receiving said purified water and producing cooled purified water said heat exchanger directing a portion of purified water back to said condenser.

6. The apparatus of claim 1, wherein said diffusion tower comprises at least one plenum separator disposed above a height of said structure for receiving said heated water stream, said plenum separator including an upward facing structure for drawing said humidified air stream out from said diffusion tower while preventing hot water from said hot water stream from being drawn out.

7. The apparatus of claim 1, wherein said direct contact condenser includes structure for producing a water spray, wherein said direct contact condenser condenses said humidified air stream through contact with said water spray.

8. The apparatus of claim 7, wherein said humidified air stream flows countercurrent to said water spray.

9. The apparatus of claim 1, wherein said direct contact condenser includes structure for providing at least a portion of said low humidity air stream, said portion of said low humidity air stream generated by dehumidifying said humidified air stream using a cooling water stream.

10. The apparatus of claim 9, wherein a single body of water provides both said heated water stream and said cooling water stream, wherein said heated water strewn is drawn from a surface of said body of water while said cooling water stream is drawn from a depth below said surface.

11. The apparatus of claim 10, wherein said heated water stream is provided exclusively by said body of water, wherein no external heat source is required to provide said heated water stream.

12. The apparatus of claim 1, wherein heat to produce said heated water stream is supplied by a solar source.

13. A power plant including a desalination system, comprising:
an apparatus for converting a source of energy into a heated water stream, said heated water stream including at least one salt;
a diffusion tower for creating regions having thin films of water from said heated water stream;
structure for forcing a low humidity air stream over said thin film of water, wherein water prom said thin film of water evaporates and diffuses into said low humidity air stream to create a humidified air stream, and
at least one direct contact condenser in fluid communication with said humidified air stream for condensing said humidified air stream, wherein purified water is produced.

14. The power plant of claim 13, wherein said humidified air stream flows countercurrent to a direction of said heated water stream.

15. The power plant of claim 13, wherein said source of energy comprises at least one fossil fuel or at least one nuclear fuel.

16. The power plant of claim 13, further comprising a heat exchanger in fluid communication with an output of said direct contact condenser for receiving said purified water and producing cooled purified water, said heat exchanger directing a portion of said cooled purified water back to said condenser.

17. The power plant of claim 13, wherein said diffusion tower comprises at least one plenum separator disposed above a height of said structure for receiving said heated water stream, said plenum separator including an upward facing structure for drawing said humidified air stream out from said diffusion tower while preventing hot water from said hot water stream from being drawn out.

18. The power plant of claim 13, wherein said direct contact condenser includes structure for producing a water spray said direct contact condenser condensing said humidified air stream through contact with said water spray.

19. The power plant of claim 13, wherein said humidified air stream flows countercurrent to said water spray.

20. The power plant of claim 13, wherein said direct contact condenser includes structure for providing at least a portion of said low humidity air stream, said portion of said low humidity air stream is generated by dehumidifying said humidified air stream using a cooling water stream.

21. A method for purifying water, comprising the steps of:
providing a heated water stream including at least one non-volatile impurity, said heated water stream having a temperature above an ambient temperature;
spraying said heated water stream onto a high surface area material, wherein thin films of water form on surfaces of said high surface area material;
forcing a low humidity air stream over said thin films of water, wherein water from said thin films of water evaporate and diffuse into said low humidity air stream to create a humidified air stream, and
direct contact condensing said humidified air stream wherein purified water is produced.

22. The method of claim 21, wherein said direct contact condensing comprises contacting said humidified air stream with a water spray.

23. The method of claim 22, wherein said humidified air stream flows countercurrent to said water spray.

24. The method of claim 21, wherein said providing step comprises utilizing low pressure condensing steam from a power plant or solar radiation.

25. The method of claim 21, wherein said spraying and forcing steps occur in a diffusion tower.

26. The method of claim 25, wherein said diffusion tower comprises at least one plenum for drawing said humidified air stream out from said diffusion tower.

27. The method of claim 26, wherein said plenum includes at least one inlet, said inlet at least in part facing a top of said diffusion tower, wherein said heated water stream is prevented from entering said plenum.

28. The method of claim 21, wherein at least a portion of said low humidity air stream is generated by dehumidifying said humidified air stream using a cooling water stream.

29. The method of claim 28, further comprising the step of utilizing a single body of water to provide both said heated water stream and said cooling water stream, wherein said heated water stream is drawn from a surface of said body of water while said cooling water stream is drawn from a depth below said surface.

30. The method of claim 29, wherein said heated water stream is provided exclusively by said body of water, wherein no external heat source is required to provide said heated water stream.

31. The method of claim 21, wherein waste heat from a power plant is used to provide heat to generate at least a portion of said heated water stream.

32. The method of claim 21, wherein said humidified air stream flows countercurrent to a direction of said heated water stream.

33. A diffusion tower for humidifying air, comprising:
a rigid outer shell, an inside volume of said shell including a portion filled with high surface area material;
at least one inlet for receiving a heated water stream, wherein at least one region having a thin film of water forms on said high surface area material;
at least one inlet for receiving a low humidity air stream, wherein said low humidity air stream is forced over said region having a thin film of water, wherein water from said thin film evaporates and diffuses into said air stream to create a humidified air stream, and at least one plenum separator disposed within said inside volume of said shell and above a height of said inlet for receiving said heated water stream, said plenum separator including an upward facing structure for drawing said humidified air stream out from said diffusion tower and preventing said hot water from said hot water stream from being drawn out.

34. The diffusion tower of claim 33, wherein said humidified air stream flows countercurrent to a direction of said heated water stream.

35. The diffusion tower of claim 33, wherein said upward facing structure for drawing requires said humidified air stream to turn 180 degrees relative to a direction of said low humidity air stream to be drawn out.

36. The diffusion tower of claim 33, wherein said diffusion, tower provides a height to diameter ratio of at least 2.

* * * * *